F. TIEMANN.
COMPRESSION OF PRECIPITATES IN SETTLING VESSELS.
APPLICATION FILED JAN. 9, 1911.
1,007,823.
Patented Nov. 7, 1911.
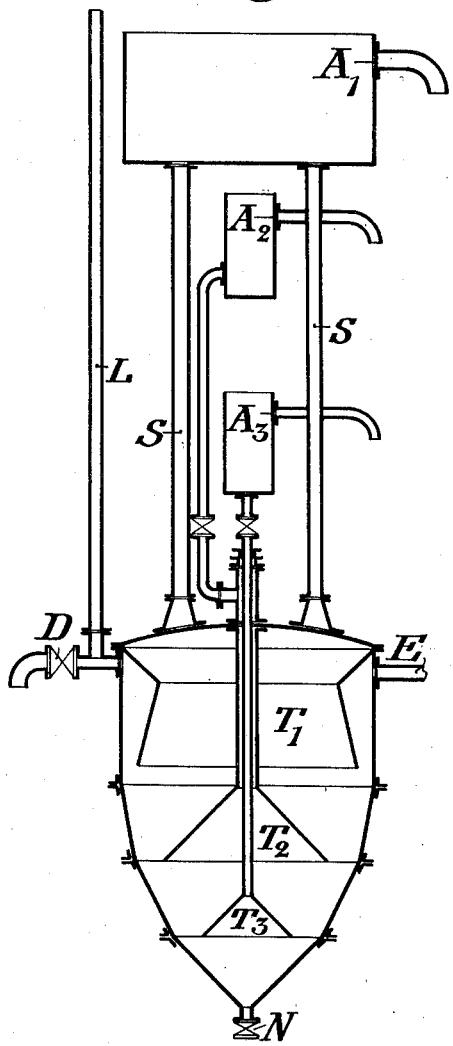
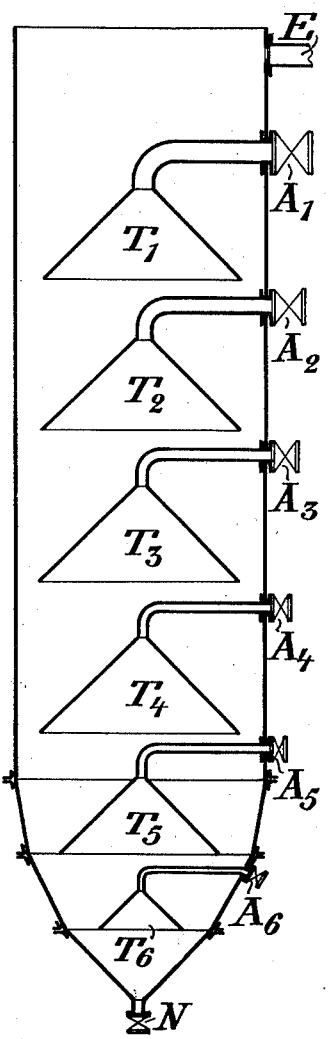

UNITED STATES PATENT OFFICE.

FRITZ TIEMANN, OF BERLIN, GERMANY.

COMPRESSION OF PRECIPITATES IN SETTLING VESSELS.

1,007,823.   Specification of Letters Patent.   Patented Nov. 7, 1911.

Application filed January 9, 1911. Serial No. 601,683.

*To all whom it may concern:*

Be it known that I, FRITZ TIEMANN, director, a subject of the German Emperor, residing at 259 Kurfürstendamm, Berlin, W., Germany, have invented certain new and useful Improvements in Compression of Precipitates in Settling Vessels; and I do hereby declare the following to be a full, clear, and exact description of the invention, such as will enable others skilled in the art to which it appertains to make and use the same.

It has been proposed to compress precipitates deposited in apparatus generally called settling vessels, more particularly in the case of useful liquids, such as sugar juice, in order to avoid the loss of excessive quantities of useful liquids when discharging the precipitates from the lower portion of the apparatus. Although the devices were to a certain extent successful, it has hitherto been impossible to compress the precipitates to a sufficient extent, more particularly those which are partly of organic nature, and therefore very bulky.

The object of this invention is to effect a more perfect compression of the said precipitates, this being attained on the basis of the following considerations.

Bulky precipitates such as for instance those obtained when purifying vegetable juice, on falling down in the settling vessel, inclose pure juice which, lower down in the apparatus, owing to the precipitates forming lumps, is contained in the form of nests. The separation of this juice in an upward direction does not take place at all, or only imperfectly, as it is inclosed in the masses which become converted into lumps; and on the one hand, the masses settling at the bottom are withdrawn from the circulation of the juice, while on the other hand, the juice masses situated lower down are prevented from rising by the new masses containing new nests of juice continuously sinking down from the top. The object of this process is therefore to shift the downward juice discharge into the lower places, namely with speed reduced in stages by means of separating bells arranged in stages, and to enable an upward circulation of juice to take place in order freely to discharge the pure juice contained in the nests, through the lumpy masses falling from the top.

Two constructions for carrying out the process according to this invention are illustrated in the accompanying drawing, in which—

Figure 1 is a vertical central section of one apparatus while Fig. 2 is a similar view of a modified apparatus.

Referring particularly to Fig. 1, the same shows a settling vessel or receptacle into which the juice or liquid to be purified is introduced at the top, as by means of an inlet pipe E. The bottom of the vessel or receptable is closed under normal conditions. Arranged interiorly of the vessel and disposed in a substantially vertical row, one above the other, are separating bells each having associated therewith an outlet for the purified juice, the outlets passing through the side wall of the vessel at points corresponding to the location of the bells. In the embodiment under consideration there are four main separating bells $T_1$, $T_2$, $T_3$, $T_4$, the corresponding juice outlets of which are indicated at $A_1$, $A_2$, $A_3$, $A_4$. These outlets are equipped with suitable closing devices by means of which the speed of the juice rising in the corresponding bells and passing out of the vessel under the pressure of the liquid in the latter, can be regulated as desired.

Below the lowermost main bell $T_4$ is arranged a somewhat smaller bell $T_5$, and below this, and in comparatively close proximity to the bottom of the vessel is a still smaller bell $T_6$. These bells are provided with corresponding outlets $A_5$, $A_6$, respectively, similar to those previously mentioned and likewise equipped with devices for regulating the flow of liquid discharged from the vessel at those points.

The operation of an apparatus of this character is substantially as follows: The juice outlets $A_1$, $A_2$, $A_3$, $A_4$ are so restricted by their closing devices that the juice is permitted to rise in the bells at a speed of say 0.2 mm. per second. Under these conditions the regulating device in connection with the bell $T_5$ should be adjusted to permit the juice to rise in the bell not faster than say 0.15 mm. per second, and the lowest bell would be so controlled as to permit the upward movement of the juice at only approximately 0.05 mm. per second. The vessel is filled with liquid up to the inlet E and the juice passes with a certain speed in a downward direction and first reaches the separating bell $T_1$. The precipitates then pass downward around said bell while the pure juice, by reason of its lower specific gravity, rises in a counter current in the bell $T_1$ at the speed previously indicated and is discharged through the outlet $A_1$. It will be understood, of course, that the solids or precipitates in the juice passing around the bell $T_1$ are subjected to a liquid pressure corresponding to the distance from E to the edge of the bell, while the passing off of the pure juice under the bell is produced by the relatively slight counter-pressure, which corresponds to the distance from the edge of the bell to the level of the outlet $A_1$. It will be obvious how these pressure differences produce a sucking of a portion of the juice out of the nests or lumps of precipitates, and the discharge of purified juice from the bell and from the apparatus. As a portion of the juice is now removed, the mixture of less juice and proportionately more precipitate passes from the bell $T_1$ to the bell $T_2$ with less speed, where again a portion of the remaining juice is conducted off in a counter current at a speed of approximately 0.2 mm. per second. The discharge speed of the juice in comparison to the speed of the juice passing downward is therefore appreciably greater than before, by reason of the fact that a portion of the juice has already been led off at the bell $T_1$.

As the mixture of juice and slimes in the main current continues its downward course, it passes the bells $T_3$, $T_4$ with substantially the results previously described. The precipitates are subjected to a larger and larger pressure, corresponding to the distance from the level of the liquid, and hence as said precipitates pass downward the compression of the same continues to increase. On the other hand, the pressure on the pure juice is not substantially increased over that in the bell $T_1$, owing to the provision of the bells located beneath the latter, the counter-pressure of liquid at each stage of the operation corresponding only to the comparatively short distance between the edge of the corresponding bell and the outlet associated with the latter. Accordingly the proportion of slimes or precipitates in the juice increases step by step as the mixture passes from bell to bell, the downward speed of the juice continually decreasing and the discharge speed of the pure juice continually increasing with respect to such first named speed. A continually increasing compression of the material separated out is thereby effected, with a corresponding step by step extraction of the juice from the nests or lumps. The comparatively slow discharge speeds used in connection with the lowermost separating bells are necessary because the masses of slimes are highly compressed in the lower part of the vessel and therefore contain comparatively little juice.

In view of the necessary small speed of the upward travel of juice, on account of the bulky specifically light precipitates, these settling vessels have to be of large diameter.

It has been further found that the rising juice entering the uppermost main separating bell, or the precipitates of the said juice falling down, must have been already exposed to high liquid pressure in order to compress under strong pressure the precipitates partly consisting of vegetable fibers or cells, so that they should become of sufficiently great specific gravity for sinking. These apparatus would have therefore to be worked with such a large quantity of useful liquid that the vegetable juice, apart from other damage, would be liable to decomposition. The apparatus shown in Fig. 2 has been designed with a view to obtain the necessary high pressure for compressing the precipitates, while avoiding the above drawback.

The pressure required for the uppermost main separating bell $T_1$, for instance one atmosphere, is obtained here by means of stand pipes S between the upper and the bottom portions of the apparatus, so that the pressure of about 10 meters of liquid at $T_1$, requires only a consumption of 1-2 cubic meters useful liquid, while an apparatus such as that shown in Fig. 1, with the same diameter of, say, four meters and also with a pressure of one atmosphere at $T_4$, would require 125 cubic meters of liquid.

In the apparatus shown in Fig. 2, juice is admitted at E. $A_1$, $A_2$, $A_3$ are used for the discharge of pure juice from the main separating bell $T_1$ and the stage bells $T_2$ $T_3$, with a speed reduced in stages to the desired degree. L is used for discharging the air, and D for removing the scum rising upward. The removal of the precipitates is effected in both apparatus at the bottom through N as soon as the precipitates are sufficiently compressed by the exhausting of the nests of juice.

Having now particularly described and ascertained the nature of my said invention and in what manner the same is to be performed, I declare that what I claim is:—

1. The herein described method of compressing precipitates in settling vessels, which consists in establishing a downward current of liquid in which the pressure gradually increases toward the bottom of the vessel, whereby the pressure on the descending solids or precipitates is gradually increased, and establishing counter currents of liquid in the main current and discharging the counter currents at different points in the height of the vessel, substantially as described.

2. The herein described method of compressing precipitates in settling vessels, which consists in creating a downward current of liquid in a settling vessel, whereby the pressure on the descending precipitates or slimes is continuously increased, and establishing rising counter currents in the main current, which carry off the purified liquid from the vessel at different points, substantially as described.

3. The herein described method of compressing precipitates in settling vessels, which consists in establishing a main downward current of the liquid in the vessel, inducing upward counter currents at different points in the length of the main current, and carrying off from the vessel at predetermined speeds the pure liquid in the rising counter currents, substantially as described.

4. The herein described method of compressing precipitates in settling vessels, which consists in establishing a downward flow or current of liquid in the vessel, inducing rising counter currents at different points in the height of the vessel, said counter currents being established one above the other and carrying off the rising pure liquid to the exterior of the vessel, and suitably regulating the speed of the several discharge currents of liquid, substantially as described.

5. The herein described method of compressing the precipitates in settling vessels, which consists in establishing a main downward current of the liquid in the vessel, whereby the pressure on the descending slimes or precipitates is continuously increased, and inducing an upward countercurrent in close proximity to the bottom of the vessel, which counter current carries off from the vessel the liquid extracted by pressure from the precipitates in the bottom of the vessel, substantially as described.

6. The herein described method of compressing precipitates in settling vessels, which consists in establishing a main downward current of the liquid in the vessel, whereby the slimes or precipitates descending in the vessel are continuously compressed in an increasing ratio, and establishing in such main current a vertical series of rising currents which carry off the pure liquid from the vessel, one of such counter currents being produced in close proximity to the bottom of the vessel in order to carry off the pure liquid extracted by pressure from the slimes at the extreme botom portion of the vessel, the speed of the discharging counter currents of liquid being controlled in a predetermined manner, substantially as described.

In testimony whereof I have affixed my signature, in presence of two witnesses.

FRITZ TIEMANN.

Witnesses:
WOLDEMAR HAUPT,
ARTHUR SCHROEDER.